United States Patent

Arnold et al.

[15] 3,675,215

[45] July 4, 1972

[54] PSEUDO-RANDOM CODE IMPLEMENTED VARIABLE BLOCK-SIZE STORAGE MAPPING DEVICE AND METHOD

[72] Inventors: Richard F. Arnold, Palo Alto, Calif.; Philip S. Dauber, Ossining, N.Y.; Edward H. Sussenguth, Stamford, Conn.

[73] Assignee: International Business Machines Corporation, Armonk, N.Y.

[22] Filed: June 29, 1970

[21] Appl. No.: 50,485

[52] U.S. Cl. .......... 340/172.5

[51] Int. Cl. .......... G06f 9/20

[58] Field of Search .......... 340/172.5

[56] References Cited

UNITED STATES PATENTS

| | | | |
|---|---|---|---|
| 3,546,677 | 12/1970 | Barton et al. | 340/172.5 |
| 3,487,370 | 12/1969 | Goshorn et al. | 340/172.5 |
| 3,412,382 | 11/1968 | Couleur et al. | 340/172.5 |
| 3,340,512 | 9/1967 | Hauck et al | 340/172.5 |
| 3,387,274 | 6/1968 | Davis | 340/172.5 |
| 3,435,420 | 3/1969 | Wissick | 340/172.5 |
| 3,437,998 | 4/1969 | Bennett et al | 340/172.5 |
| 3,482,214 | 12/1969 | Sichel et al. | 340/172.5 |
| 3,525,985 | 8/1970 | Melliar-Smith | 340/172.5 |
| 3,327,294 | 6/1967 | Furman et al | 340/172.5 |
| 3,331,056 | 7/1967 | Lethin et al | 340/172.5 |
| 3,569,938 | 3/1971 | Eden | 340/172.5 |

*Primary Examiner*—Paul J. Henon
*Assistant Examiner*—Ronald F. Chapuran
*Attorney*—Hanifin and Jancin and Peter R. Leal

[57] ABSTRACT

A directory, or index, of variable-sized pages of data for use in a two-level storage system employing virtual addressing, wherein data is stored in a large capacity main storage and retrieved to a smaller, faster buffer storage for processing. If a desired piece of data indicated by a virtual address is not currently resident in buffer storage, the location of the beginning of the page containing that data in main storage is found by searching the directory. Directory addresses for searching the directory are formed by a pseudo-random function of two parameters, the virtual address and a count. Since a larger page-size entry will be addressed statistically more frequently than a smaller page-size entry, a new directory entry for a given page size is made in the first location along its algorithm chain which currently contains either an invalid entry or a smaller page-size entry. Thus, it may be necessary to relocate a smaller page-size entry further down its chain.

12 Claims, 8 Drawing Figures

*INVENTORS*
RICHARD F. ARNOLD
PHILIP S. DAUBER
EDWARD H. SUSSENGUTH

*BY* [signature]

ATTORNEY

| COUNT | ALLOWABLE PAGE SIZE ENTRY | | | |
|---|---|---|---|---|
| | 4K | 1K | 1/4K | 1/16K |
| 0 | X | X | X | X |
| 1 | | X | X | X |
| 2 | | | X | X |
| 3 | | | | X |
| 4 | X | X | X | X |
| 5 | | X | X | X |
| 6 | | | X | X |
| 7 | | | | X |
| 8 | X | X | X | X |
| 9 | | X | X | X |
| 10 | | | X | X |
| 11 | | | | X |
| 12 | X | X | X | X |
| 13 | | X | X | X |
| 14 | | | X | X |
| 15 | | | | X |
| 16 | X | X | X | X |
| 17 | | X | X | X |
| 18 | | | X | X |
| 19 | | | | X |
| 20 | X | X | X | X |
| 21 | | X | X | X |
| 22 | | | X | X |
| 23 | | | | X |
| 24 | X | X | X | X |
| 25 | | X | X | X |
| 26 | | | X | X |
| 27 | | | | X |
| 28 | X | X | X | X |
| 29 | | X | X | X |
| 30 | | | X | X |
| 31 | | | | X |

PSEUDO-RANDOM CODE IMPLEMENTED VARIABLE BLOCK-SIZE STORAGE MAPPING DEVICE AND METHOD

BACKGROUND OF INVENTION

1. Field of Invention

This invention relates to a storage system in an electronic digital computer. More particularly, this invention relates to a directory, or storage mapping device, for use in a two-level storage system comprising a main or backing store containing system information and a highspeed, or buffer, store against which information is processed, wherein information is addressed in terms of virtual addresses.

2. Description of Prior Art

To meet present and future data processing needs, ultrafast, large-scale digital computers have been and are continuing to be developed. These computers are potentially capable of processing vast amounts of data in a short period of time. However, the full potential of these digital computers has not been fully realized for several reasons. One of the most important reasons is the inability to move data from a storage area to a processing area with desired speed. To overcome this problem, storage systems have been developed which have two levels of storage. An example of such a storage system is seen in U.S. Pat. application Ser. No. 887,469, filed Dec. 23, 1969, and assigned to the assignee of the present invention. Such an invention greatly increases the effective use of the potential computing power of fast, electronic digital computers. One element of the above-mentioned invention is a directory which is used as a catalogue of names, or virtual addresses, of data and their corresponding physical locations in main storage. An example of one type of directory can be seen in U. S. Pat. No. 3,317,898, assigned to the common assignee. However, directories in the prior art, too, have suffered from a problem involving too long a period of time required for their search in order to locate a desired data entity.

Accordingly, it is the general object of this invention to provide an improved directory which allows the location of a desired data entity in a main storage with a minimal amount of search time.

A more particular object of the invention is to provide a directory in a high-speed digital computer for determining the physical address in main storage of varible-sized pages of data.

A still more particular object of the present invention is to provide a pseudo-random algorithm implemented directory, wherein pages of different size have certain allowable entry positions within the directory, such that more frequently accessed page sizes will statistically be found earlier in a directory search.

SUMMARY OF THE INVENTION

The invention relates to a form of a directory, or index, for use in a two-level storage system wherein information is stored in main storage in terms of variable-sized pages and is processed against from a high-speed or backing store. For the present embodiment, page sizes are considered to 64-word pages, 256-word pages, 1,024-word pages and 4,096-word pages. A particular virtual address may be included in any of four pages, i.e., the 64-word page containing the address, or the 256-, 1,024-, or 4,096-word pages. The size is unknown at the initiation of the search, and the sequence of directory addresses generated when looking for it must locate it regardless of the page size.

The directory has a set of entry locations or directory addresses. Each virtual address has assigned a subset of this set within which the appropriate physical address can reside as an entry. The subset of addresses is generated by randomizing the virtual address and using the result to address the directory. That is, the location in the directory is computed as a pseudo-random function of two parameters, the virtual address and a count. The function, to be described in more detail subsequently, can be denoted as H(VA,cnt). The search is performed as follows. The first directory entry fetched is that at directory address H(VA,0). The directory entry comprises an I.D., which can be a copy of the virtual address, and the physical address in MS at which the page containing the data named by the virtual address begins. If the ID does not identify a page containing the virtual address, the directory entry at H(va,1) is fetched and tested. This process continues with the count being incremented by one for each mismatch until the ID of the fetched entry matches the requested virtual address, or until the count exceeds the number of addresses in the subset, in which case a missing address exception occurs.

A larger-sized page will be accessed more often than a smaller-sized page. For example, a 4,096-word page will be accessed 64 times as often as a 64-word page. Therefore, the directory algorithm provides, broadly, that the virtual address-physical address pair for a 4,096-word page can be entered in the directory on only every fourth count, for a 32-directory entry embodiment. Likewise, a 1,024-word page can only be entered two out of four counts; a 256-word page, can be entered on three out of every four counts. A 64-page entry can be entered with any count. The string of counts for any virtual address is called its "chain."

Accordingly, the foregoing and other objects, features and advantages of the invention will be apparent from the following more particular description of the preferred embodiment of the invention as illustrated in the accompanying drawings.

DESCRIPTION OF PREFERRED EMBODIMENT

Before discussing the structure of a preferred embodiment of our invention, it is desirable to introduce and define some of the terminology to be used herein.

Directory Entries

Directory entries serve as the index to the pages which are currently resident in MS.

Key

A quantity used to provide address space privacy and storage protection.

Line

A storage quantity having length of 64 words for this embodiment. There are 2, 8, 32 or 128 lines in a page.

MS Pointer

The field in the directory entry which specifies the physical address of the beginning of the MS page where the referenced data resides.

Page

The logical entity of storage in MS. A 64, 256, 1,024 or 4,096 word storage quantity for this embodiment.

Page Identifier

This field in the directory entry provides a unique identifier for the page currently represented by this directory entry.

Virtual Address

A logical storage address which uniquely defines, or names, a specific data quantity. The virtual address is 36 bits wide for this embodiment.

Word
The physical storage entity.

STRUCTURE

Figure 1:
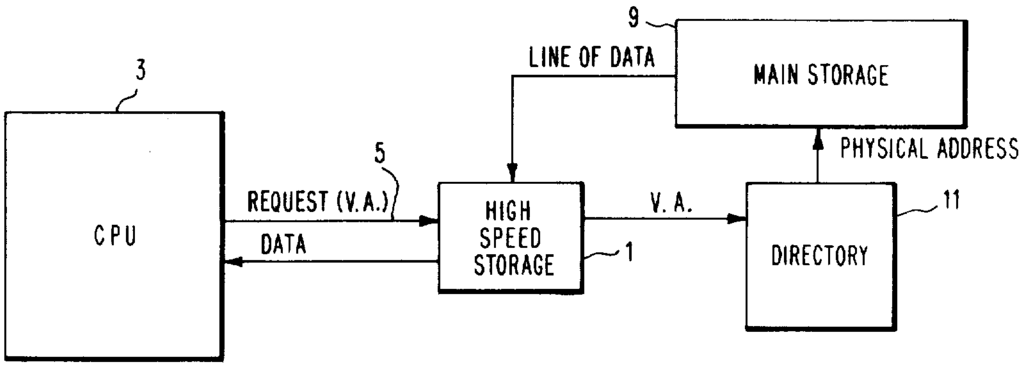
FIG. 1 is a block diagram of a two-level storage system within which the directory of our invention finds use.

Referring to FIG. 1 there is seen a generalized block diagram of a two-level storage system within which the directory of our invention finds use. In FIG. 1, CPU 3 is connected by line 5 to high-speed storage (HSS) 1. The CPU provides a request in terms of a virtual address to HSS 1. If the data named by the virtual address is currently resident in HSS 1, it is immediately sent back to CPU 3 for processing over the data bus. HSS 1 is connected via the VA bus to directory 11 which is connected to main storage (MS) 9. If the requested virtual address is not currently resident in HSS, then the virtual address is sent to the directory which is searched to locate the MS physical address at which the page containing the desired data quantity begins. MS is then accessed and a number of data words, which includes the data requested by the original virtual address, is sent to high-speed storage. The requested data will ultimately be sent over the data bus to the CPU. For a more detailed description of a two-level storage system depicted generally in FIG. 1, the reader is referred to U. S. Pat. application Ser. No. 887,469, referenced above.

Figure 2:
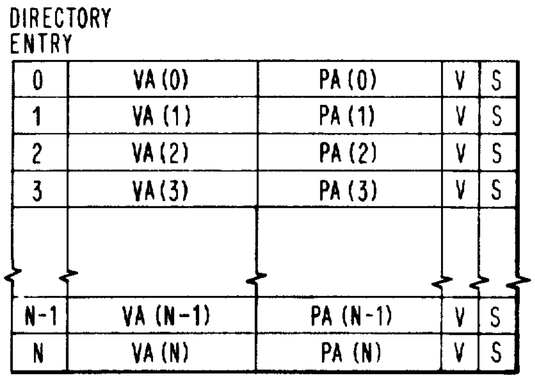
FIG. 2 is a schematic representation of the directory.

Referring to FIG. 2 there is seen a graphical representation of the entry stored in the directory. The directory entries are numbered 0 – N, and each is seen to comprise an identifier, which is essentially a virtual address, and also a physical address in main storage corresponding to the associated virtual address. Also, each entry has associated therewith the size of the page wherein the data indicated by the virtual address is to be found. Further, a validity bit may be included to indicate that the entry is currently valid. The page size is not included in the virtual address request, but can be added to the directory entry by the operating system. This may be done by any of several well-known means, such as, for example, using a table look-up associating a given virtual address with a given page size and inserting the page size in the corresponding directory entry when that entry is made.

DIRECTORY SEARCH

Figure 3:
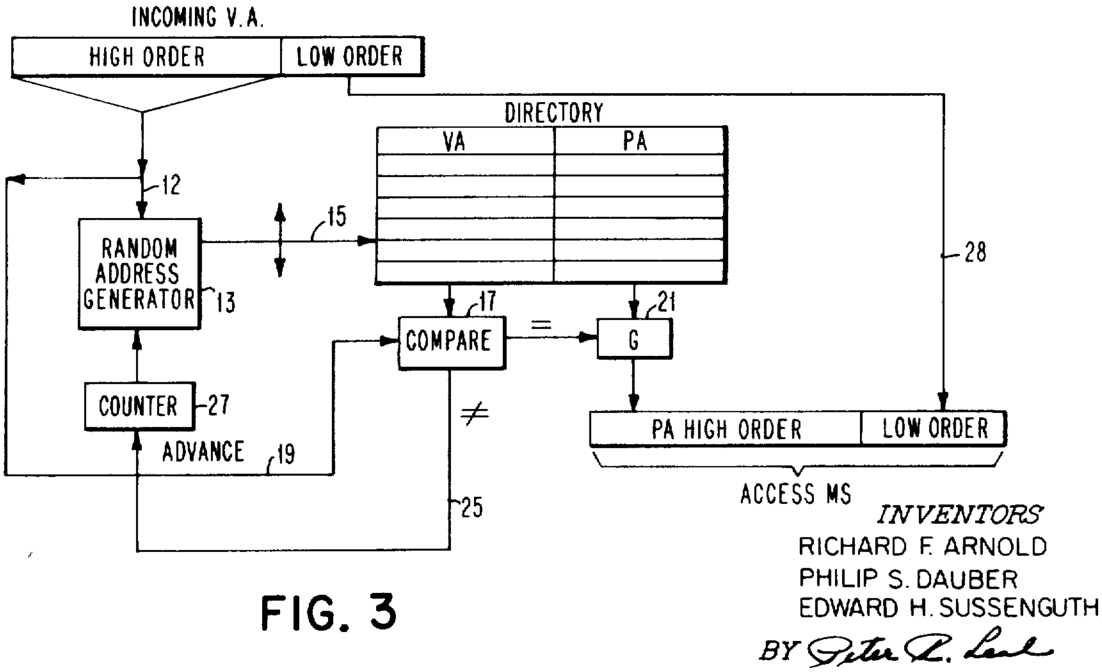
FIG. 3 is an illustration of apparatus useful in searching the directory of our invention.

Referring to FIG. 3 there is seen apparatus useful for searching the directory when it is determined that the data requested by a virtual address from the CPU is not currently resident in highspeed storage for processing. At that point the virtual address is presented to the directory for searching. For the search function, the virtual address is presented over bus 12 to random address generator 13, then also over bus 19 to compare apparatus 17. Random address generator 13 generates a physical directory address over bus 15 which is used to access the identifier portion of the directory entry at the generated directory address. The ID is sent to comparison circuitry 17. If the identifier in the directory entry compares with the virtual address, then the corresponding physical address is gated via gate 21 and used to access to the desired page in main storage. Certain of the low-order virtual address bits can be used to address to a particular subset of words to be transferred to HSS. This will be explained in detail subsequently.

If, on the other hand, the identifier does not compare with the incoming virtual address, then a signal over line 25 advances counter 27 one position, a new random address is generated and the process continues. As will be made more clear in a subsequent detailed description of the random address generator, there are, for this embodiment, a set of 512 possible directory addresses. Each virtual address, because of the pseudo-random algorithm used in the random address generator, can reside in a subset of 32 directory addresses, within that 512 number. It will be apparent to one of ordinary skill in the art that this number can be increased or decreased by changing the algorithm. Therefore, since the counter is initialized at zero, if there is an advance of counter 27 to a count of 31 with no successful compare, then a missing page exception, well known in the art, may be generated. However, since this does not form a part of the invention, it will not be discussed further at this point.

RANDOM ADDRESS GENERATOR

The random address generator which was represented at 13 in FIG. 3 can be constructed according to the following teaching, by one of ordinary skill in the art. Virtual addressing is well known. For the present embodiment, a virtual address of 36 bits is assumed. Furthermore, the count for counter 27 of FIG. 3 will vary between 0 and 31; thus there will be five bits of count information entering into the pseudo-random algorithm in the random address generator. The physical directory address is a 10-bit quantity indicating 512 addresses in the directory itself. This address and count information is summarized below:

| | |
|---|---|
| Virtual Address | $a_0a_1a_2 \ldots a_{35}$ |
| Count | $c_0c_1c_2c_3c_4$ |
| Physical Directory Address | $p_0p_1 \cdots p_{10}$ |

Using well-known shift apparatus and also well-known Exclusive OR,OR and AND circuitry, the random address generator generates a random address for the value of each count for each virtual address searched. This is done as follows: Bits $a_1a_2 \ldots a_{22}$ are rotated left $2n$ positions, where $n$ is the value of the count, yielding an intermediate result:

$$g_1{}^n\ g_2{}^n \ldots g_{22}{}^n$$

The PDA is then formed:

$$
\begin{aligned}
p_0 &= g_{11}{}^n \veebar g_{12}{}^n \veebar ((c_3 \vee c_4) \wedge a_{23})\\
p_1 &= g_{10}{}^n \veebar g_{13}{}^n \veebar ((c_3 \vee c_4) \wedge a_{24})\\
p_2 &= g_9{}^n \veebar g_{14}{}^n \veebar (c_3 \wedge a_{25})\\
p_3 &= g_8{}^n \veebar g_{15}{}^n \veebar (c_3 \wedge a_{26})\\
p_4 &= g_7{}^n \veebar g_{16}{}^n \veebar ((c_3 \wedge c_4) \wedge a_{27})\\
p_5 &= g_6{}^n \veebar g_{17}{}^n \veebar ((c_3 \wedge c_4) \wedge a_{28})\\
p_6 &= g_5{}^n \veebar g_{18}{}^n \veebar c_4\\
p_7 &= g_4{}^n \veebar g_{19}{}^n \veebar c_3\\
p_8 &= g_3{}^n \veebar g_{20}{}^n \veebar c_2\\
p_9 &= g_2{}^n \veebar g_{21}{}^n \veebar c_1\\
p_{10} &= g_1{}^n \veebar g_{22}{}^n \veebar c_0
\end{aligned}
$$

Figures 4, 5:
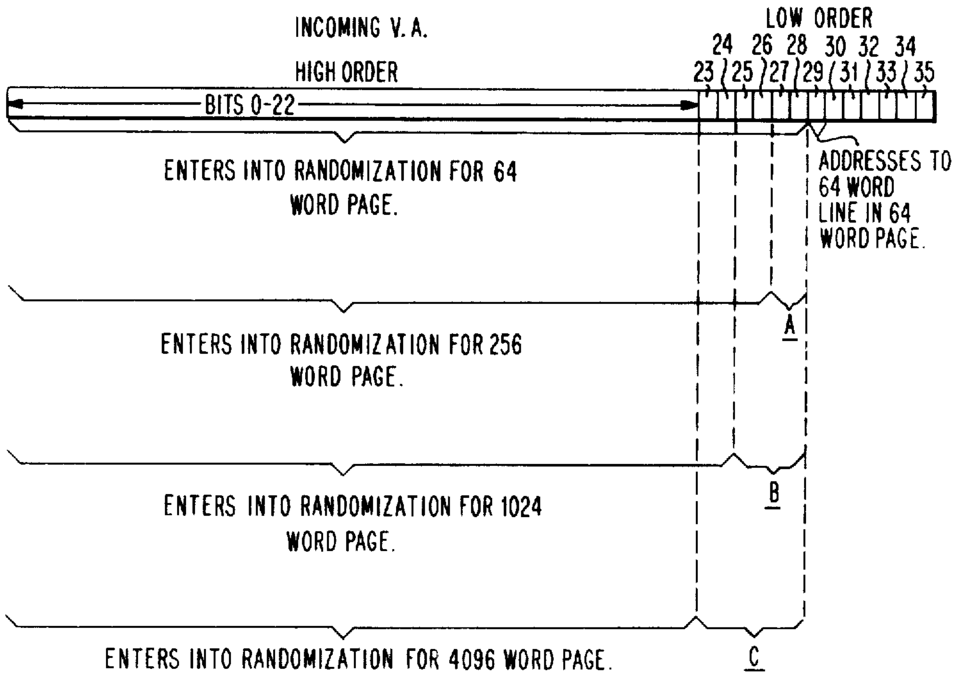
FIG. 4 is a graphical representation showing the general operation of the pseudo-randomizing algorithm upon an incoming virtual address in the directory of our invention.
FIG. 5 is a schematic representation of an algorithm chain according to which directory entries are made in our invention.

This algorithm can be explained more clearly by examining it in conjunction with FIG. 4. It will be recalled that the particular piece of data named by a virtual address may be included in any of four pages, i.e., the 64-word page containing the address, or the 256-, 1,024-, or 4,096-word pages. Which size it is is not included in the virtual address itself, and the sequence of directory addresses generated by the random address generator must locate it regardless of the page size. This is done by using the count argument of the pseudo random algorithm. The two, low-order count bits effectively mask off appropriate pairs of virtual address bits $a_{23}$ through $a_{28}$ accordingly, as the account is 0, 1, 2, or 3 modulo 4. These bits, in pairs, are those which distinguish among pages of the same size. This reflects the entry strategy, wherein a directory entry for a 4,096-word page can be entered legitimately only with a count of 0, 4, 8 . . . Similarly, a directory entry for a 1,024-word page can be entered with a count of 0, 1, 4, 5, 8, 9 . . . ; in a 256-word page with a count of 0, 1, 2, 4, 5, 6, 8, 9, 10 . . . ; and a 64-word page entry can be entered with any count. Thus, when a directory entry is made, it is made such that a new directory entry is made in the first location along its chain which currently contains either an invalid entry or a smaller size page entry. Therefore, since a larger size page will be accessed more often than a smaller size page, the average directory search time will be a minimum.

The above is summarized in FIG. 5. An entry for a given virtual address of 4,096 (or 4K) words can be made with a count of 0, 4, 8, . . . 28. Entries for other size pages are made similarly as noted. When searching, a larger-size page entry will therefore be found earlier in its chain.

The manner in which the algorithm uses the count to mask off appropriate pairs of virtual address bits when searching, as the count is 0, 1, 2, or 3 modulo 4, can be seen by examining the above algorithm. For example, if the count is 0 modulo 4, then count bits $C_3$ and $C_4$ will both be zero. Thus, virtual address bit *a*23 is masked off by virtue of $p_0$, *a*24 is masked off in $p_1$, *a*25 is masked off by virtue of $p_2$, *a*26 is masked off by virtue of $p_3$, *a*27 is masked off by virtue of $p_4$, and *a*28 is masked off by virtue of $p_5$. Thus, only bits 0 – 22 enter into the randomization for a 4,096-word page, corresponding to a count of 0 modulo 4 in the algorithm. A summary of the bits masked off and those which enter into the algorithm for each count value modulo 4 follows.

| Count Modulo 4 $C_3C_4$ | **Bits Masked Off** | Bits Included in Randomization |
|---|---|---|
| 00 | 23,24,25,26,27,28 | — |
| 01 | 25,26,27,28 | **23,24** |
| 10 | 27,28 | **23,24,25,26** |
| 11 | — | **23,24,25,26,27,28** |

Thus, referring to FIG. 4 and to the above algorithm, it can be seen that bits 0 – 22 enter into the randomization for a size 4,096-word page, and lower; bits 0 – 24 enter into the randomization for a size 1,024-word page, and lower. Bits 0 – 26 enter into the randomization for a size 256-word page and lower, and bits 0 – 28 enter into randomization for a 64-word page.

Figure 3A:
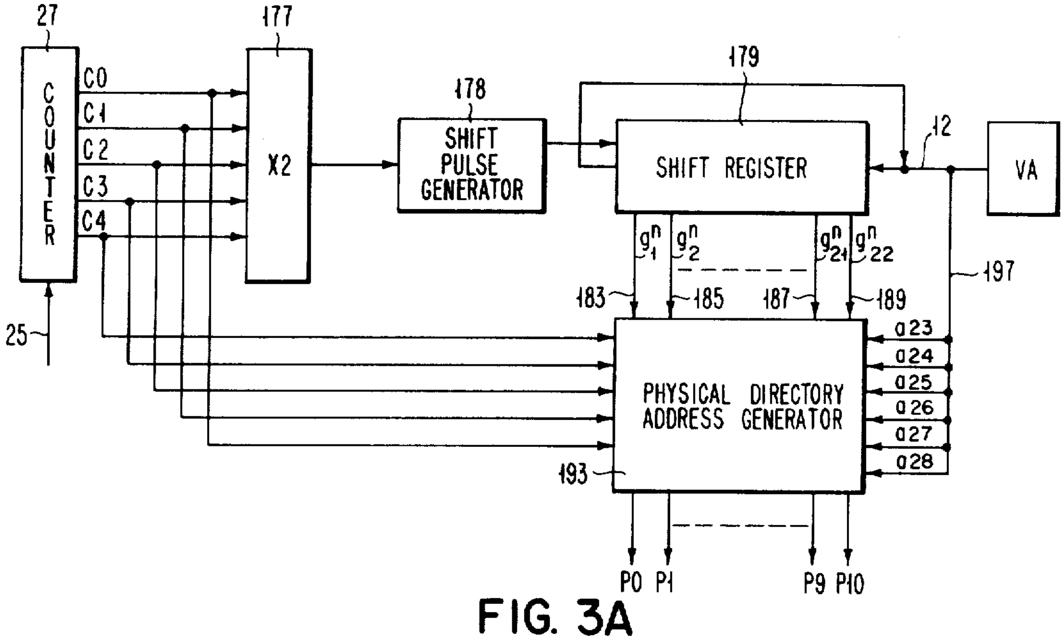
FIG. 3A is an illustration of the pseudo-randomizing means useful in our invention.
Figure 3B:
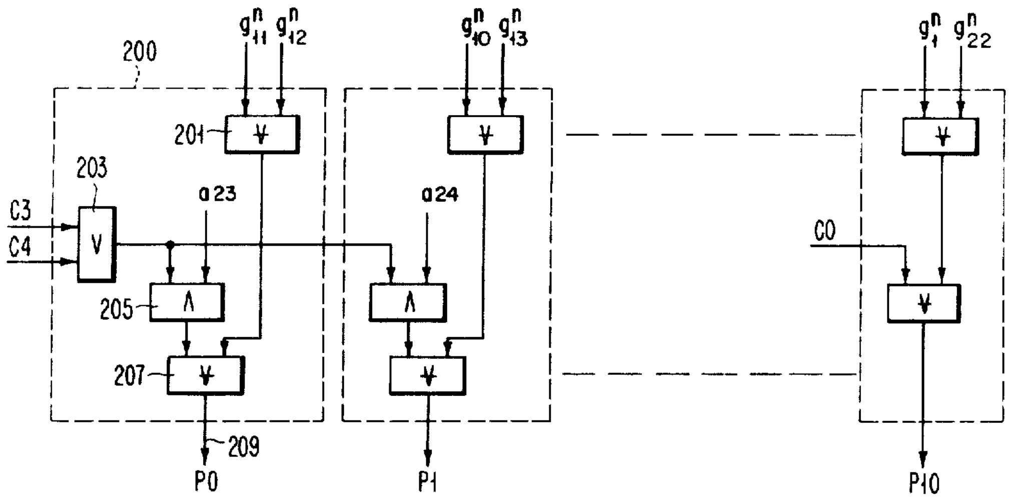
FIG. 3B is an illustration of the physical directory address generator means within the pseudo-randomizing means useful in our invention.

An exemplary apparatus for generating the physical directory addresses according to the foregoing teaching can be seen by examining FIG. 3A and FIG. 3B. In FIG. 3A is seen a counter which is the same as counter 27 of FIG. 3. It will be recalled that this counter contains five bits of count information described earlier and defined as $c_0$, $c_1$, $c_2$, $c_3$, $c_4$. Lines transmitting the bits of count information are connected from counter 27 to multiplying means 177, well known in the art, which serves to multiply the value of the count by 2. This multiplied value of the count is connected via a bus to well known shift pulse genrating 178. The high order bits of the virtual address, namely bits $a_1a_2 \ldots a_{22}$, are transmitted over bus 12 to shift register 179. Shift pulse generator 178 controls the number of positions that the above bits of the virtual address are shifted left or rotated according to the value (2*n*) of the output of multiplier 177. Lines 183, 185, . . . , 187, 189 connected from shift register 181 to physical directory address Generator 193 contain the bits of the virtual address after rotation to the left 2*n* positions, namely bits $g_1^n$, $g_2^n$, . . . , $g_{21}^n$, $g_{22}^n$, respectively, as defined above. Certain high order bits of the virtual address are transmitted over bus 197 to physical directory address generator 193. These are bits $a_{23}$, $a_{24}$, $a_{25}$, $a_{26}$, $a_{27}$, and $a_{28}$. Similarly, bits $c_0$, $c_1$, $c_2$, $c_3$, and $c_4$, are transmitted from counter 27 to physical directory address generator 193. The physical directory address generator has outputs $p_0$, $p_1$, . . . , $p_9$, $p_{10}$, which are the bits of the physical directory address as defined by the above equations. The physical directory address generator itself can be seen in FIG. 3B. It will be noted that this is merely the implementation of the equations for each physical directory address bit given previously using well known AND, OR, and exclusive OR circuitry. For example, and referring concurrently to FIG. 3B and the equation for bit $p_0$, bits $g_{11}^n$ and $g_{12}^n$ are exclusive OR'*d* in Exclusive OR gate 201. Also, bits $c_3$ and $c_4$ from the count are OR'*d* together in OR gate 203 and the result is ANDed together with virtual address bit $a_{23}$ in AND gate 205. The output of AND 205 and Exclusive OR gate 201 serve as inputs to Exclusive OR gate 207, the output of which is physical directory address bit $p_0$ on line 209. The rest of physical directory address generator 193 is constructed similarly according to the above equations.

In summary, when an incoming virtual address is being searched in the directory, the above randomizing algorithm is employed to generate the directory addresses which are searched to determine the physical address corresponding to the beginning of the page in main storage which includes the word named by the virtual address. When a successful comparison is found, the physical address, which addresses to the beginning of a particular page size entity is gated out of the directory as described previously in FIG. 3. That physical address, then, is used to access to the beginning of the page. The particular number of words, including the requested word which is to be replaced from main storage to the high-speed storage for later transmission to the user or CPU, can be determined in many ways. One manner illustrating, but not limiting, the manner in which the particular number of words within a given-sized page are accessed is to use certain ones of the low-order bits of the virtual address as alluded to in FIG. 3. For example, when the virtual address is originally assigned, naming the requested piece of data, the low-order six bits, namely bits 30 – 35 for this embodiment, address to the particular desired word, or half-word, as the case may be. Bits 23 – 29 can then be chosen at assignment time to define between certain word entities within a given size page. Referring to FIG. 4, there is seen a manner in which this may be done for 64-word entities. For example, assuming that the desired piece of data defined by the virtual address was found within the directory searched to be in a 64-word page, then all 64 words can be read as a line of data to the high-speed storage in FIG. 1 by using bit *a*29. If the virtual address is found to be contained in a 256-word page, then bits 27 and 28, which did not enter into the randomization for the directory address, could be used to define one of four 64-word lines which are then transferred to high-speed storage. This is noted as A in FIG. 4. Likewise, for a 1,024-word page, bits 25 – 28 could be used to define which one of the 16, 64-word lines will be moved into high-speed storage. This is seen at B in FIG. 4. Likewise, all of bits 23 – 28, which did not enter into the randomization for a 4,096-word page, could be used to define which one of the 64, 64-word groups within the 4,096-word page is to be placed into high-speed storage from MS for processing. There are, of course, many other ways apparent to those of ordinary skill in the art to determine which part of the page in MS is to be replaced into high-speed storage.

ENTRY STRATEGY

A detailed description of the strategy, mentioned previously, for making entries into the directory is as follows. Referring to the illustration in FIG. 5 for a given virtual address, a new directory entry is to be made in the first location along its chain which currently contains either an invalid entry (e.g., empty) or a smaller page size entry. Thus, it may be necessary to relocate a smaller page size further down its chain. The advantage of this strategy, as pointed out above, is that the larger page size entry, which will be accessed more frequently, will be found earlier along its chain than a smaller page-size entry.

Figure 6:
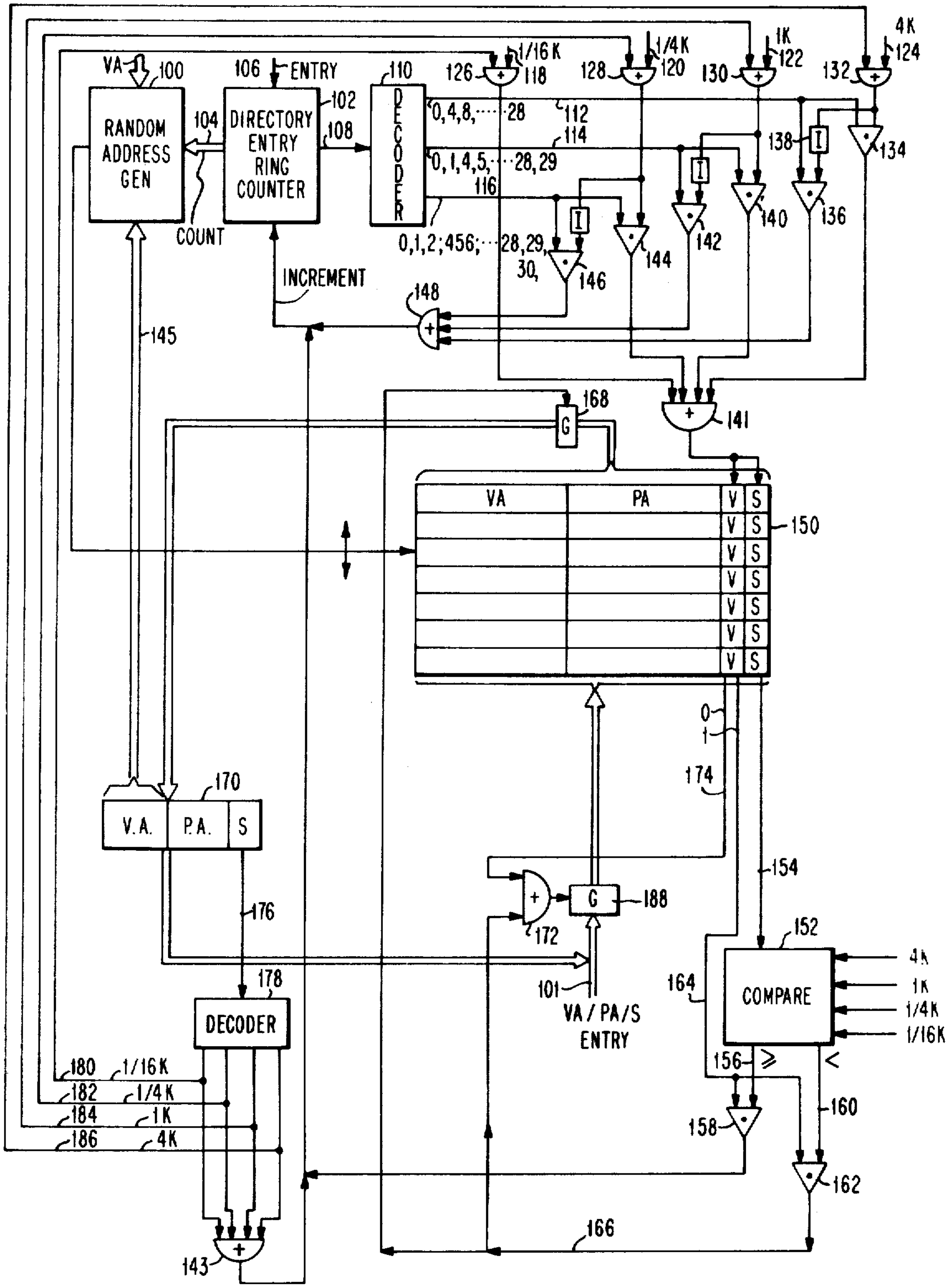
FIG. 6 is an illustration of apparatus useful in employing the directory entry strategy depicted in FIG. 5.

While the page size is not included in the virtual address, it is included within the directory entry. As mentioned above, this can be done in many ways familiar to those of ordinary skill in the art. For example, upon originally making entries into the directory, a table lookup scheme could be employed to associate a given virtual address and its physical address in main storage with its page size. An example of structure which could be used to make entries once this size association is accomplished is seen in FIG. 6. In that figure there is seen random address generator 100 which is the same type of generator as seen in FIG. 2 and which could be, and generally is, the same piece of apparatus. Directory entry ring counter 102, which can be the same piece of apparatus as counter 27 seen in FIG. 3 is connected by bus 104 to the random address generator. A second input to generator 100 is the virtual address associated with the entry to be made. Line 106 is a line connected to the directory entry ring counter which indicates that an entry is about to take place and initializes the counter to zero. The counter is also connected by bus 108 to decoder 110 which decodes the current count. Decoder 110 activates line 112 if the count is 0 modulo 4, activates line 114 if the count is 0 or 1 modulo 4, and activates line 116 if the count is 0, 1, or 2 modulo 4. Lines indicating a page size for a particular entry can be seen as lines 118, 120, 122 and 124, which could be indications from the table look-up alluded to previously. The AND function of lines 112, 114 and 116 with lines indicating a given page size will enable an entry relating to a particular page size to be entered in a legitimate directory location according to its algorithm chain as depicted in FIG. 5. This will be made more clear in a subsequent detailed example of operation. Each of lines 118, 120, 122 and 124 are connected to OR gates 126, 128, 130 and 132, respectively. The outputs of OR gates 128 – 132 are connected to two AND gates. For example, the output of OR gate 132 is connected to AND gate 134 and to AND gate 136 by way of inverter 138. Similarly, the output of line 112 is connected as a second input to And gates 134 and 136. Similar arrangements are made for the output of OR 130 and line 114, respectively and the output of OR 128 and line 116, respectively. The outputs of AND gates 134, 140, 144 and the output of OR gate 126 are connected to OR gate 141. OR gate 126 is connected directly to OR 141 without intermediary AND gating from counter 102 since the input thereto indicates a 64-word page size, which can be entered with any count, as indicated in FIG. 5. The output of OR 141, when activated, serves to drive out for test the validity bit and the size indicator at the directory entry indicated by the random address generator output to determine if conditions are appropriate for entry. The output of AND gates 136, 142, and 146 are connected to OR 148, the output of which serves to increment directory entry ring counter 102 by one.

Also provided is comparison circuitry 152. One input to comparison circuitry 152 is bus 154 which contains the size of the directory entry currently being accessed at the address generated by random address generator 100. A second set of entries to comparison apparatus 152 is a group of lines indicative of the page size to which the entry about to be made relates. These lines can be the same as lines 118, 120, 122, and 124 above. Line 156 is connected from the compare circuitry to AND gate 158 and, when active, indicates that the page size associated with the directory entry currently accessed is greater than or equal to the page size which relates to the entry about to be made. Line 160 is connected between compare circuitry 152 and AND 162. Line 160, when active, indicates that the size of the currently accessed entry is less than the page size relating to the entry about to be made. Line 164 is connected from the validity bit portion of the directory to AND gates 158 and 162 and, when active, indicates that the currently accessed directory address has a valid entry. The output of AND gate 162 is line 166 which, when active, indicates that the currently accessed directory entry contains an entry whose related page size is less than the page size of the entry about to be made. Therefore, line 166 is connected as enabling signal to gate 168. Gate 168 is effective to transmit the directory entry at the currently accessed address to register 170 for temporary storage while it is being relocated to a position further down its chain, according to the entry strategy. That is, line 166 indicates that the entry at the location in the directory currently being tested is smaller than the entry about to be made into the directory. Therefore, it will be relocated down its chain, and the entry about to be made will be gated over bus 101 into the currently accessed directory location by way of gate 188 via OR 172. Line 174 is connected between the compliment side of the validity bit for the row being accessed by the address from random address generator 100, and OR gate 172. When line 174 is active, it means that the validity bit for the accessed location is a zero (i.e., location empty) and, therefore, the location can receive the entry about to be made, without the necessity for relocating a smaller size entry further down its chain.

It will be noted that temporary storage register 170 contains the virtual address identifier, the physical address, and the size of an entry which is to be located further down its chain due to the fact that the entry has been determined to relate to a page smaller in size than that of the entry about to be made. Size field S is connected via bus 176 to decoder 178. Decoder 178 is well known in the art and decodes the size field into bit-significant lines 180, 182, 184, and 186. These lines are connected, respectively, to OR gates 126, 128, 130 and 132 to control accessing of the address further down the chain, into which the entry in register 170 will be relocated.

Operation of the entry and relocation mechanism of FIG. 6 can be seen by examining FIGS. 5 and 6 concurrently. Assume that a directory entry is about to be made relating to a 4K page in MS. Further assume that the first five directory address generated with counts 0 – 4 have previous entries resident in the following sizes.

| Count | Page Size of Entry |
|---|---|
| 0 | 4K |
| 1 | 1K |
| 2 | 1/16 K |
| 3 | 1/16 K |
| 4 | 1 K |
| 5 | empty |

As can be seen from the above table, an entry relating to the page size of 4K has previously been made in the directory location generated by the randomizing algorithm using a count of zero. Similarly, an entry relating to a page size of 1K has previously been made at the directory address generator with the count of one; likewise, entries of 1/16 K have been made with counts of two and three, and a 1K entry has been made with a count of four. These are legitimate entries as can be seen from FIG. 5.

If it is now desired to make another directory entry relating to a 4K page, line 124 of FIG. 6 will be activated. Similarly, line 106 will initialize the directory entry ring counter 102 which will send an address of zero to random address generator 100 which will generate a directory address. Decoder 110 will also receive the count of zero over bus 108 and will activate line 112 which will enable AND 134 which, in turn, enables OR 141 to drive the validity bit and the size field from the accessed address in directory 150. Since, from the above table, there is a 4K word already in this address, line 164 will be activated. Further, the 4K line will be active as an input to compare circuitry 152. Since the incoming entry relates to the same page size (4K) as is currently in the entry at the accessed address, line 156 will be activated. The combination of lines 164 and 156 will activate AND 158 to increment the counter to its next count, namely 0001. This count, and the virtual address, or identifier portion of the entry to be made, will cause the random address generator 100 to generate a second address. Decoder 110, since the count is 0001, will activate lines 114 and 116. However, since neither of OR gates 128 or 130 are activated at this time, OR gate 141 will not be activated. However, by virtue of the inverters associated with the outputs of OR's 128 and 130, AND gates 142 and 146 will be activated which, in turn, activate OR 148 to increment the counter to its next position. Operation will continue similarly until the counter is incremented to a count of 4. At that point, line 112 will again be activated. Since the entry about to be made relates to a 4K page, line 124 is active. Therefore, the output of AND 134 will cause OR 141 to drive the validity bit and the size field from the directory location accessed at the random address generated with a count of four. At this point, the size driven out, which was postulated as 1K in the above example, is sent over bus 154 to compare circuit 152. Likewise, the 4K line into compare circuit 152 is again active. Therefore, line 160 will be activated since the page size relating to the entry at the accessed address is less than the page size relating to the entry which is about to be made. Also, line 164 will be active. This will cause AND gate 162 to activate line 166. At this point, and assuming proper timing, well-known to those of ordinary skill in the art, line 166 gates the 1K directory entry via gate 168 into temporary storage register 170. Similarly, after a suitable delay to allow that entry to be gated out, line 166 activates OR 172 to gate the new entry from bus 101 into the accessed position in the directory. At this point, the new entry is complete, but the entry which was driven out into register 170 must be relocated further down its chain. Therefore, the size field from the relocation register 170 is decoded in decoder 178. Since the size was postulated to be 1K, line 184 activates OR gate 130. The virtual address is sent over bus 145 to random address generator 100. Similarly, OR gate 143 is activated which increments the directory entry ring counter to its next count, namely five, to enable random address generation. At that point, line 114 from decoder 110 is activated. Since OR gate 130 has been activated by the page size relating to the entry about to be relocated further down its chain, AND gate 140 activates OR 141 which now drives out the validity bit and size bit from the directory address generated with a count of five. Since this address was postulated as being empty in the above table, line 174 will activate OR 172 which will gate the entry in relocation register 170 into the currently accessed directory address. While the above is an example of making an entry into a directory for an entry relating to a 4K word page, including relocation of a smaller-size page entry further down the chain, it will be recognized by those of ordinary skill in the art that similar examples can be constructed for each page size.

While the above embodiment was described as being particularly directed toward a CPU environment with a two-level storage system having a main storage and a high-speed storage, it will readily be apparent to those of ordinary skill in the computer art that the directory could as easily be used for other types of storage. For example, it could serve as a directory between a large capacity, slower-speed storage device, such as a random access disk file, a tape drive, a tape library, or the like, and a lower-capacity, faster-speed storage device such as a very fast random access disk storage with either moveable or fixed heads, or the like.

While the invention has been particularly shown and described with reference to a preferred embodiment thereof, it will be understood by those skilled in the art that various changes in the form and details may be made therein without departing from the spirit and scope of the invention.

What is claimed is:

1. A variable page size storage indexing device for indexing information between two storages, comprising, in combination:
   - directory storage means having locations for storing indexing information entries associated with various sizes of pages of information stored in a storage apparatus;
   - pseudo-random address generating means coupled to said directory storage means for generating a plurality of addresses for addressing predetermined ones of said locations;
   - interrogating means, coupled to said pseudo-random address generating means and to said directory storage means for detecting an indication of the size of the page with which the entry in each of said predetermined ones of said locations is associated as the address of said each is generated;
   - first means, responsive to said interrogating means and coupled to said directory storage means, for fetching the entry from the first of said each of said predetermined ones of said locations which contains an entry associated with a page size less than the associated page size of a new entry about to be made into said directory storage; and
   - second means, responsive to said interrogating means and coupled to said directory storage means for entering said new entry into said first of said each of said predetermined ones of said locations.

2. The combination of claim 1 wherein said interrogating means includes means for detecting whether the entry in any of said each of said predetermined ones of said locations is invalid.

3. The combination of claim 2 further including means responsive to the detection of an invalid entry in one of said each of said predetermined ones of said locations for entering said new entry into said one of said each of said predetermined ones of said locations.

4. The combination of claim 3 further including means for relocating said fetched entry into another of said predetermined ones of said locations, said another location currently containing an invalid entry or an entry associated with a page size less than the page size associated with said fetched entry.

5. In a system containing variable size pages of data in storage, apparatus for locating the physical address of the beginning of a page of data in said storage in response to the logical name of a data entity contained in said page comprising, in combination:
   - a directory storage having a set of addressable locations for containing entries associating the logical name of a data entity with the physical address of the page containing said data entry in said storage, each said entry also associated with the size of said page;
   - pseudo-randomizing means, coupled to said directory storage and responsive to a logical address name, for generating at least one sequence of addresses for accessing a subset of said set of addressable directory storage locations;
   - interrogating means, coupled to said pseudo-randomizing means and to said directory storage, for detecting the size of the page with which the entry in each member of said subset is associated, as the address of each member of said subset is generated; and
   - means coupled to said interrogating means for entering a new entry, associating said logical name with a physical address and a given page size, into the first member of said subset which contains an entry associated with a page size less than said given page size.

6. The combination of claim 5 wherein said interrogating means includes means for detecting whether the entry in any member of said subset is invalid.

7. The combination of claim 6 further including means responsive to the detection of an invalid entry in a member of said subset for entering said new entry into said member of said subset.

8. The combination of claim 7, further including second means responsive to said pseudo-randomizing means for interrogating entries in members of said subset to detect the logical name of a desired data entity; and
   - means responsive to said detection of said logical name for fetching the physical address associated with said logical name of said desired data entity to be used for accessing data in said storage.

9. In a system containing variable size pages of data in a storage means, apparatus for entering indexing information entries associating the logical name of a data entity with the physical address of the page of data within which said data entity is stored, and with the size of said page, and also for retrieving said indexing information from said directory storage comprising, in combination:
   - a directory storage having a set of addressable locations for containing said entries;
   - pseudo-randomizing means coupled to said directory storage for generating at least one sequence of addresses for accessing a subset of said set of addressable directory storage locations;
   - first means, responsive to said pseudo-randomizing means and to the page sizes associated both with entries in members of said subset and with entries to be inserted into said subset, for inserting entries associated with larger size pages into earlier members of said subset than entries associated with smaller size pages;
   - second means responsive to said pseudo-randomizing means for interrogating entries in members of said subset to detect a desired entry associating a predetermined logical name with a physical address; and
   - means responsive to the detection of said desired entry for fetching at least part of said desired entry for use in accessing data in said storage means.

10. The method of making entries into a directory storage, said directory storage having locations for storing indexing information comprising entries associated with varying sizes of pages of information stored in a storage apparatus, including the steps of:

generating a sequence of addresses by pseudo-random address generating means for addressing predetermined ones of the location of a directory storage;

interrogating said predetermined ones of said locations to detect an indication of the size of the page with which the entry in said location is associated;

fetching the entry from the first of said predetermined ones of said locations which contains an entry associated with a page size less than the associated page size of a new entry about to be made into said directory storage; and entering said new entry into said first of said predetermined ones of said locations.

11. The combination of claim 10 further including the step of relocating said fetched entry into a location defined by a subsequently generated address, said location currently containing an invalid entry or an entry associated with a page size less than the page size associated with said fetched entry.

12. The method of making entries into and searching a directory storage containing entries associated with various sizes of pages of information stored in a storage apparatus, said entries for indexing information between two storages, including the steps of:

generating a sequence of addresses by pseudo-random address generating means for accessing a subset of the locations of a directory storage;

inserting entries associating logical names of data with physical addresses of pages of various size pages containing said data into members of said subset, such that entries relating to larger size pages are entered at earlier members of said subset than entries relating to smaller size pages; and generating a sequence of addresses by pseudo-random address generating means for use in interrogating entries in members of said subset of locations to detect an entry associating a predetermined logical name with a physical address; and fetching at least part of said entry associating a predetermined logical name with a physical address.

* * * * *